Patented Nov. 29, 1938

2,138,025

UNITED STATES PATENT OFFICE 2,138,025

MATERIAL FOR INITIATING A WELDING ARC

John D. Crecca and Samuel S. Scott, St. Albans, N. Y.

No Drawing. Original application January 13, 1934, Serial No. 706,510. Divided and this application June 19, 1936, Serial No. 86,152

3 Claims. (Cl. 219—8)

(Granted under the act of March 3, 1883, as amended April 30, 1928; 370 O. G. 757)

This invention relates to material for initiating the arc between two bodies that are to be electrically welded together, particularly when one of those bodies is of relatively small cross sectional area on the surface thereof to be joined to the other body, such as a stud, while maintaining the two bodies spaced apart a distance equal to the proper length of the welding arc and without establishing a solid conductive connection between the two bodies.

It is the object of this invention to provide a material of the kind and for the purpose specified to facilitate those welding operations to which it is adapted and to secure a greater percentage of sound, strong welds by making it possible to space accurately the bodies to be welded before the welding current is turned on.

This is a division of our copending application, Serial No. 706,510, filed January 13, 1934, since matured into Patent No. 2,057,670, dated Oct. 20, 1936.

While the present invention is particularly adapted for use with welding apparatus of the type disclosed in our said copending application, its usefulness is not limited thereto, but it may be applied in many ways that will suggest themselves to those skilled in this art. For purpose of illustration only, and not by way of limitation, the invention will be described in connection with the welding of a stud or the like to a plate. In such cases it is the usual practice to use the stud to be welded as an electrode, and it will hereinafter be so designated.

A material that we have found to be very satisfactory for this purpose is two parts of steel chippings and one part of aluminum filings; however, these terms are not to be taken as restrictive of the form of the metal particles since these particles may be granular, filamentary, or laminar, and should be of a size larger than will pass through a number 8 mesh screen. The aluminum serves as a scavenger of oxygen and to prevent porosity of the weld, while the iron supplies additional bonding material. A small quantity of the material is placed upon the plate at the situs of the weld and the electrode is then properly positioned with respect to the plate with the end of the electrode spaced from the plate a distance equal to the proper arc length. The arc-initiating material acts to cause the arc to be struck as soon as the welding circuit is closed without the necessity of moving the electrode into contact with the plate and withdrawing it to the arc distance after the current has begun to flow. This is due to the fact that the potential across the arc space sets up a flux that moves the particles of the material to short circuit the gap. For welding a half-inch stud, about 150 milligrams of the arc-initiating material is sufficient; if too great a quantity be used, the molten metal will splash and may freeze on the threads of the stud. The aluminum acts as a scavenger of oxygen and so assists in forming strong, non-porous welds. The ferrous metal used should be free of oxide. Instead of making a heap of the arc initiating material upon the surface of the plate, the material may be caused to adhere to the end of the electrode by means of glue, glycerine, or other adhesive.

This invention may be manufactured or used by or for the Government of the United States of America for governmental purposes without the payment of any royalties thereon or therefor.

We claim:

1. A material for initiating an electric arc while maintaining the electrodes spaced apart, comprising a loose intermixture of steel chippings and aluminum filings substantially in the proportion of two parts of the former to one of the latter.

2. A material for initiating an electric arc while maintaining the electrodes spaced apart, comprising a loose intermixture of ferrous metal and an oxygen-scavenging metal, both in the form of filamentary, granular, or laminar particles, substantially in the proportion of two parts of the former to one of the latter.

3. A material for initiating an electric arc between electrodes maintained in spaced apart relation, comprising unconfined metallic particles which, when disposed between said electrodes in contact with one thereof and subjected to the flux due to a potential applied across the gap between said electrodes, are movable by said flux to short circuit the said gap and establish an arc.

JOHN D. CRECCA.
SAMUEL S. SCOTT.